(12) United States Patent
Takano (10) Patent No.: US 11,471,993 B2
(45) Date of Patent: Oct. 18, 2022

(54) SPACER, LAMINATE OF SUBSTRATES, METHOD FOR MANUFACTURING SUBSTRATE, AND METHOD FOR MANUFACTURING SUBSTRATE FOR MAGNETIC DISK

(71) Applicant: HOYA CORPORATION, Tokyo (JP)

(72) Inventor: Masao Takano, Akishima (JP)

(73) Assignee: HOYA CORPORATION, Tokyo (JP)

( * ) Notice: Subject to any disclaimer, the term of this patent is extended or adjusted under 35 U.S.C. 154(b) by 336 days.

(21) Appl. No.: 16/644,127

(22) PCT Filed: Mar. 11, 2019

(86) PCT No.: PCT/JP2019/009826
§ 371 (c)(1),
(2) Date: Mar. 3, 2020

(87) PCT Pub. No.: WO2019/172456
PCT Pub. Date: Sep. 12, 2019

(65) Prior Publication Data
US 2021/0005220 A1    Jan. 7, 2021

(30) Foreign Application Priority Data

Mar. 9, 2018  (JP) .............................. JP2018-043362

(51) Int. Cl.
*B32B 27/32*  (2006.01)
*B24B 9/10*  (2006.01)
(Continued)

(52) U.S. Cl.
CPC ................ *B24B 9/10* (2013.01); *B32B 7/022* (2019.01); *B32B 27/32* (2013.01); *B32B 27/36* (2013.01);
(Continued)

(58) Field of Classification Search
CPC ... B24B 9/10; B32B 2250/42; B32B 2255/02; B32B 2262/0246; B32B 2262/0253;
(Continued)

(56) References Cited

U.S. PATENT DOCUMENTS

2013/0075895 A1   3/2013  Miura et al.
2015/0255103 A1   9/2015  Ueda

FOREIGN PATENT DOCUMENTS

CN        103010742 A    4/2013
CN        103022021 A    4/2013
(Continued)

OTHER PUBLICATIONS

Notice of Completion of Formalities for Patent Registration in the corresponding Chinese Patent Application No. 201980004601.0, dated Jul. 15, 2021.
(Continued)

*Primary Examiner* — Lawrence D Ferguson
(74) *Attorney, Agent, or Firm* — Global IP Counselors, LLP (57) ABSTRACT

The area of a spacer that is to be provided between the adjacent substrates in a laminate including a plurality of substrates to keep the adjacent substrates apart from each other is smaller than those of the stacked substrates. When pressure is released to bring the laminate obtained by providing the spacers between the substrates from a pressed state in which 0.60 MPa of pressure is applied to the laminate in the stacking direction into a non-pressed state, an amount of change ΔW in thickness per spacer that is calculated from a change in the thickness of the laminate due to the release of pressure is 30 μm or less.

13 Claims, 3 Drawing Sheets

(51) Int. Cl.
    *B32B 7/022*     (2019.01)
    *G11B 5/73*     (2006.01)
    *B32B 27/36*     (2006.01)
    *B32B 27/40*     (2006.01)
    *B32B 37/10*     (2006.01)
    *B32B 37/14*     (2006.01)
    *B32B 37/18*     (2006.01)
    *B32B 38/00*     (2006.01)
    *C03C 19/00*     (2006.01)
    *G11B 5/84*     (2006.01)

(52) U.S. Cl.
    CPC .............. *B32B 27/40* (2013.01); *B32B 37/10* (2013.01); *B32B 37/144* (2013.01); *B32B 37/18* (2013.01); *B32B 38/105* (2013.01); *C03C 19/00* (2013.01); *G11B 5/73921* (2019.05); *G11B 5/8404* (2013.01); *B32B 2250/42* (2013.01); *B32B 2307/7265* (2013.01); *B32B 2307/734* (2013.01); *B32B 2315/08* (2013.01); *B32B 2323/10* (2013.01); *B32B 2367/00* (2013.01); *B32B 2375/00* (2013.01); *B32B 2429/02* (2013.01)

(58) Field of Classification Search
    CPC .... B32B 2262/0261; B32B 2262/0284; B32B 2262/0292; B32B 2307/538; B32B 2307/7265; B32B 2307/73; B32B 2307/734; B32B 2315/08; B32B 2323/10; B32B 2367/00; B32B 2375/00; B32B 2429/02; B32B 27/08; B32B 27/10; B32B 27/12; B32B 27/20; B32B 27/308; B32B 27/32; B32B 27/34; B32B 27/36; B32B 27/40; B32B 29/005; B32B 29/02; B32B 37/10; B32B 37/144; B32B 37/18; B32B 38/105; B32B 5/022; B32B 5/024; B32B 5/26; B32B 7/022; C03C 19/00; G11B 5/73921; G11B 5/8404
    See application file for complete search history.

(56) References Cited

FOREIGN PATENT DOCUMENTS

| | | |
|---|---|---|
| CN | 103747959 A | 4/2014 |
| CN | 204036735 U | 12/2014 |
| CN | 104584126 A | 4/2015 |
| JP | 2011230276 A | 11/2011 |
| JP | 2013069380 A | 4/2013 |
| JP | 2013073636 A | 4/2013 |
| JP | 2014056639 A | 3/2014 |

OTHER PUBLICATIONS

International Search Report in PCT/JP2019/009826 dated Apr. 9, 2019.

SPACER, LAMINATE OF SUBSTRATES, METHOD FOR MANUFACTURING SUBSTRATE, AND METHOD FOR MANUFACTURING SUBSTRATE FOR MAGNETIC DISK

CROSS-REFERENCE TO RELATED APPLICATIONS

This U.S. National stage application of International Patent Application No. PCT/JP2019/009826, filed on Mar. 11, 2019, which, in turn, claims priority to Japanese Patent Application No. 2018-043362, filed in Japan on Mar. 9, 2018. The entire contents of Japanese Patent Application No. 2018-043362 are hereby incorporated herein by reference.

BACKGROUND

Field of the Invention

The present invention relates to a spacer, a laminate of substrates, a method for manufacturing a substrate, and a method for manufacturing a substrate for a magnetic disk. The spacer is a sheet-like member, and when a laminate of a plurality of substrates is formed for the purpose of processing the end faces of the substrates, the spacer is provided between the adjacent substrates in the laminate to keep the adjacent substrates apart from each other.

Background Information

A magnetic disk obtained by providing a magnetic layer on a non-magnetic disk-shaped glass plate for a magnetic disk is used in a hard disk drive for data recording.

When the glass plate for a magnetic disk is manufactured, the main surfaces and the end faces (inner end face and outer end face) of the glass plate are ground or polished. In order to increase the polishing efficiency for the end faces of glass plates, a method in which a plurality of glass plates are stacked in the normal direction of a main surface to form a laminate of glass plates and the end faces of multiple glass plates are simultaneously polished using a polishing jig such as a polishing brush is employed when polishing the end faces of glass plates. In such a laminate, spacers for glass plates to be subjected to end face polishing are each provided between the glass plates to keep the glass plates apart from each other in order to prevent the glass plates from coming into intimate contact with each other or prevent the main surfaces of the glass plates from rubbing against each other and being damaged.

When the end faces of the glass plates are polished, both the outer end faces and the inner end faces are polished. Accordingly, when the laminate of glass plates is polished as described above, glass plates are stacked on a jig for polishing outer end faces and the outer end faces are polished in a state in which the glass plates are pressed, and then the inner end faces are polished. In this case, it is necessary to release the glass laminate from the pressed state and disassemble the laminate (separate the glass plates) between a step of polishing the outer end faces and a step of polishing the inner end faces.

A jig for stacking glass plates with which the outer end faces and the inner end faces can be polished without releasing the pressing force applied to such a glass laminate and disassembling the glass laminate is known (JP 2013-73636A).

The above-mentioned jig for stacking glass plates includes a shaft that is inserted into circular holes of glass plates for a magnetic recording medium to support a laminate of glass plates and align the glass plates for a magnetic recording medium. Clamp bolt fitting portions to which clamp bolts can be fitted are provided at two ends of the shaft, and a shaft fastening portion for supporting the laminate of glass plates is provided around the shaft.

SUMMARY

When using the above-mentioned jig for stacking glass plates, it is unnecessary to release the pressing force applied to the laminate of glass plates and disassemble the laminate, and thus the production efficiency is increased.

However, the above-mentioned jig for stacking glass plates has a complicated device configuration and is difficult to handle. In addition, it is necessary to configure a polishing jig such as a polishing brush that matches the jig for stacking glass plates, and thus the versatility in end face polishing is reduced. Moreover, with the above-mentioned jig for stacking glass plates, the number of glass plates to be stacked is set or fixed to 100 or more, for example, and therefore, it is not possible to freely determine the number of glass plates to be allocated to inner end face polishing and the number of glass plates to be allocated to outer end face polishing in consideration of a difference in polishing time between the inner end face polishing and the outer end face polishing such that the efficiency of the production of glass plates is increased. In this regard, it may be disadvantageous to use the above-mentioned jig for stacking glass plates for end face polishing.

On the other hand, it is possible to release the pressing force applied in a direction in which the glass plates are stacked and exchange a stacking jig for outer end face polishing for a stacking jig for inner end face polishing, or a stacking jig for inner end face polishing for a stacking jig for outer end face polishing, without disassembling the laminate of glass plates (separating the glass plates). However, in this case, pressure applied to the laminate in a pressed state is released, and therefore, the position of a spacer provided between the adjacent glass plates may shift due to restoration of the shape of the spacer, and the positions of the adjacent glass plates may also shift relative to each other due to this positional shifting of the spacer. If the laminate of glass plates is pressed again and the end face polishing is performed in the state in which the positions of glass plates have shifted, the position of a glass plate relative to a glass plate adjacent thereto changes, and thus the machining allowance varies in chamfered faces and a side wall face.

The chamfered faces provided on an end face may not be appropriately polished due to positional shifting of a spacer. For example, if a spacer provided between adjacent glass plates moves toward the chamfered faces due to the positional shifting, the way a polishing brush comes into contact with the vicinity of a recessed portion formed between the chamfered faces changes, and thus uniform polishing cannot be performed in some cases.

It is difficult to confirm whether or not positional shifting has occurred, and therefore, in order to obtain a laminate in which positional shifting does not occur, the laminate must be disassembled and then reconstructed by arranging the glass plates and the spacers at predetermined positions again. However, the disassembling and reconstruction of a laminate are complicated operations.

When pressure applied to a laminate of glass plates in a pressed state is released, it is not preferable that the position of a spacer as well as the positions of the glass plates shift due to restoration of the shape of the spacer.

To address this, it is an object of the present invention to provide a spacer that is to be provided between adjacent substrates in a laminate of substrates such as glass plates to keep the adjacent substrates apart from each other and with which positional shifting of a spacer that occurs when pressure applied to the pressed laminate is released can be suppressed and thus positional shifting of the substrates can also be suppressed. Also, it is an object thereof to provide a laminate of substrates including such a spacer, a method for manufacturing a substrate in which end face polishing is performed on the laminate including the spacer, and a method for manufacturing a substrate for a magnetic disk.

An aspect of the present invention is a sheet-like spacer to be used when a laminate of a plurality of substrates is formed for the purpose of processing end faces of the substrates, the spacer being provided between the adjacent substrates in the laminate to keep the adjacent substrates apart from each other.

The area of the spacer is smaller than that of the substrates, and when pressure is released to bring the laminate obtained by providing the spacers between the substrates from a pressed state in which 0.60 MPa of pressure is applied to the laminate in a stacking direction into a non-pressed state, an amount of change $\Delta W$ in thickness per spacer that is calculated from a change in the thickness of the laminate due to the release of pressure is 30 µm or less.

It is preferable that the spacer is made of resin.

It is preferable that a contact angle of the spacer with respect to pure water is 50° or less.

It is preferable that the spacer has a surface roughness Ra of 0.2 µm or more.

It is preferable that the spacer is water-resistant.

Another aspect of the present invention is a laminate including: a plurality of substrates; and the above-mentioned spacer provided between the adjacent substrates of the plurality of substrates.

Yet another aspect of the present invention is a method for manufacturing a substrate, including processing a side face of the above-mentioned laminate.

Yet another aspect of the present invention is also a method for manufacturing a substrate, including processing a side face of the above-mentioned laminate of substrates.

The processing performed on the side face of the laminate includes:

processing for bringing the laminate into a pressed state;

first side face processing for processing a side face of the laminate in the pressed state;

processing for releasing the laminate from the pressed state after performing the first side face processing;

intermediate processing for performing one of dividing the laminate released from the pressed state into two or more laminates, combining the laminate released from the pressed state with another laminate in a stacking direction, and leaving the laminate released from the pressed state as it is;

processing for bringing the laminate that has undergone the intermediate processing into a pressed state after performing the intermediate processing; and second side face processing for further processing a side face of the laminate that has undergone the intermediate processing and is in the pressed state.

It is preferable that the laminate is brought into the pressed state by using a jig to press substrates located at the two ends of the laminate in the stacking direction.

It is preferable that the substrate is a glass plate.

Yet another aspect of the present invention is a method for manufacturing a substrate for a magnetic disk. The method for manufacturing a substrate for a magnetic disk includes:

processing for manufacturing a substrate to be used to produce a substrate for a magnetic disk using the above-mentioned method for manufacturing a substrate including processing the side face of the laminate; and postprocessing including at least polishing a main surface of the substrate after the side face of the laminate is processed.

With the above-described spacer, laminate of substrates, method for manufacturing a substrate, and method for manufacturing a substrate for a magnetic disk, it is possible to suppress positional shifting of a spacer that occurs when pressure applied to a laminate in a pressed state is released and also suppress positional shifting of the substrates.

DETAILED DESCRIPTION OF THE EMBODIMENTS

As described above, a laminate of glass plates in which a spacer is provided between glass plates to keep the glass plates apart from each other is brought into a pressed state, and pressure applied to the laminate in the pressed state is released between a step of polishing the outer end faces and a step of polishing the inner end faces. However, the positions of the glass plates and the spacer may shift due to the release of the pressure. It was found that such positional shifting depends on the characteristics of the spacer. In particular, it was found that the greater a change in the thickness of the spacer is when pressure is released from the spacer in the pressed state, the more likely it is that the above-mentioned positional shifting will occur, and the greater the positional shifting amount will be. In view of these findings, an aspect disclosed below was made.

The spacer is a sheet-like member, and when a laminate of a plurality of substrates is formed for the purpose of processing the end faces of the substrates, the spacer is provided between the adjacent substrates in the laminate to keep the adjacent substrates apart from each other. The spacer may have the same shape as that of the substrate. For example, the spacer has a disk shape. The areas of the faces of the spacer that come into contact with a substrate are smaller than the area of the substrate.

For example, in end face polishing processing that is performed when the end faces of the substrates are processed, the end faces (the outer end faces or the inner end faces) of the substrates are polished using a polishing jig such as a polishing brush, a polishing pad, or a sponge in a state in which the laminate of substrates is pressed in the stacking direction (the thickness direction of the substrate) while a polishing liquid containing cerium oxide or the like as a polishing agent is supplied to the end faces.

At this time, when 0.60 MPa of pressure applied to the laminate formed by stacking a plurality of substrates with the spacers being provided therebetween is released to bring the laminate from a pressed state into a non-pressed state, the amount of change $\Delta W$ in thickness per spacer is 30 µm or less. The amount of change $\Delta W$ in thickness per spacer is calculated from the thickness of the laminate that changes due to the release of the pressure.

When the above-mentioned amount of change $\Delta W$ in thickness per spacer is 30 µm or less as described above, post-end-face-processing problems posed due to positional shifting of the substrates and the spacer (e.g., a partial increase in surface roughness, and variation in polishing allowance between the substrates, in the case of the end face polishing processing) are reduced.

The amount of change $\Delta W$ is measured as a characteristic of the spacer as described below, for example. First, a laminate is formed by stacking one hundred and ten substrates, a single spacer, and five substrates in the stated order from the bottom in a dry state. The thickness of the laminate in a pressed state (with 0.60 MPa of pressure) is used as a reference, and the amount of change in thickness of the laminate is measured after the pressure is released. The measurement value is taken as an amount of change A. On the other hand, a laminate is produced in the same manner as in the above-mentioned laminate, except that the spacer is not used. The amount of change in thickness of the laminate between before and after the pressure is released is measured, and the measurement value is taken as an amount of change B.

The amount of change $\Delta W$ is calculated from these values using the equation below.

$$(\text{amount of change } \Delta W) = (\text{amount of change } A) - (\text{amount of change } B)$$

Here, the thickness of the laminate increases because the thickness of the spacer is restored due to the release of the pressure applied to the laminate in the pressed state. It takes some time for the restoration of the thickness of the spacer depending on the material, and therefore, it is preferable that the amount of change A and the amount of change B are measured 1 minute after the pressure is released.

In one embodiment, the amount of change $\Delta W$ is preferably 20 µm or less, and more preferably 10 µm or less. This makes it possible to suppress positional change of the substrate or spacer when the pressure is released. On the other hand, a spacer whose amount of change $\Delta W$ is close to zero and that does not change in thickness at all is not preferable because it may damage the surface of the substrate. From this viewpoint, the amount of change $\Delta W$ is preferably 0.05 µm or more, and more preferably 0.1 µm or more.

It should be noted that the amount of change $\Delta W$ need only be 30 µm or less, and there is no particular limitation on an average thickness W1 of the spacers in a non-pressed state (initial state). Depending on the material of the spacer, it is possible to set the amount of change $\Delta W$ to be within the above-mentioned range by reducing the average thickness W1 of the spacers, but an excessively thin spacer has low durability (i.e., it is likely to be damaged or broken) and is thus not preferable from the viewpoint of durability. The average thickness W1 of the spacers is 50 to 1,500 µm, for example. It is preferable that the average thickness W1 is smaller because the number of lamination layers per unit length can be increased. From this viewpoint, W1 is preferably 1,000 µm or less, more preferably 500 µm or less, and even more preferably 300 µm or less. On the other hand, if the average thickness W1 is excessively small, a spacer is likely to be damaged and thus less frequently reused. From this viewpoint, the average thickness W1 is preferably 100 µm or more.

The substrate in the description below is a glass plate. However, the substrate includes plates such as an aluminum alloy substrate, a silicon substrate, and a titanium substrate, in addition to the glass plate. The substrate has a disk shape provided with a central hole, for example, and may also have a circular shape without a central hole, a quadrangle shape, or the like other than a disk shape. Although there is no particular limitation on the thickness of the substrate, the thickness of the substrate is preferably 2 mm or less, more preferably 0.7 mm or less, and even more preferably 0.6 mm or less, from the viewpoint of increasing the number of lamination layers and improving the processing efficiency. Out of substrates, the present invention is particularly suitable for manufacturing of a glass substrate for a magnetic disk in which two end faces, namely the inner end face and the outer end face, need to be polished and on which there is strict demand for a reduction in production cost.

End face processing performed on the substrate includes end face polishing processing in which the end face of a substrate is polished by moving the end face of the substrate and a polishing jig brought into contact with the end face of the substrate relative to each other at the contact portion, or end face grinding processing. It should be noted that the end face processing includes a mode of end face polishing processing in which both the end face of the substrate and the polishing jig are moved at the contact portion as well as a mode of end face polishing processing in which only one of the end face of the substrate and the polishing jig is moved to perform polishing. In this case, the area of the spacer is smaller than that of the substrate such that the spacer does not protrude from the end face of the substrate.

When pressure applied to the laminate is released to bring the laminate from a pressed state in which pressure is applied to the laminate in the stacking direction into a non-pressed state after the completion of first processing and before the start of second processing, the end face processing includes a mode in which different end faces of the substrate are processed, and a mode in which the same end face is processed twice. The processing performed on the same end face twice includes two modes of different processing precisions such as grinding processing and polishing processing, or rough polishing processing and fine polishing processing.

Figure 1A:
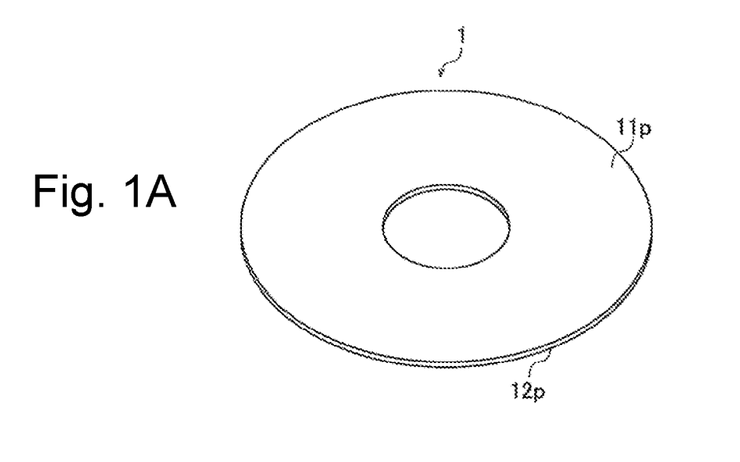
FIG. 1A is a perspective view of an example of a glass plate produced in one embodiment.
Figure 1B:
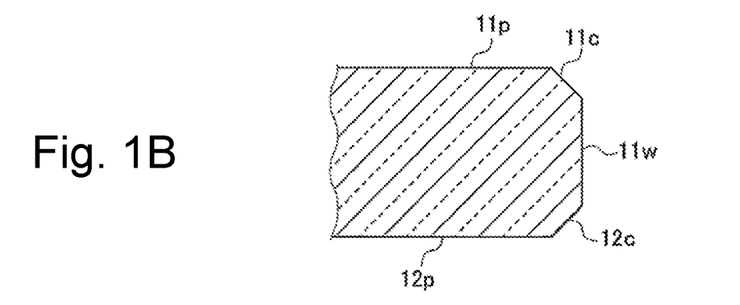
FIG. 1B is a diagram showing an example of a cross section of an end face of the glass plate shown in FIG. 1A.

FIG. 1A is a perspective view of an example of a glass plate that is stacked on another with a spacer of one embodiment being provided therebetween and is subjected to end face polishing. FIG. 1B is a diagram showing an example of a cross section of an end face of the glass substrate shown in FIG. 1A.

A glass plate 1 shown in FIG. 1A is a thin glass plate having a disk shape provided with a circular hole at the center thereof. The glass plate 1 can be used as a glass substrate for a magnetic disk. When the glass plate 1 is used as a glass substrate for a magnetic disk, there is no particular limitation on the size of the glass substrate for a magnetic disk, but the size of the glass substrate for a magnetic disk is a size of a glass substrate for a magnetic disk with a nominal diameter of 2.5 inches or 3.5 inches, for example. In the case of a glass substrate for a magnetic disk with a nominal diameter of 3.5 inches, the outer diameter is 95 mm, the inner diameter of the circular hole is 25 mm, and the thickness is 0.3 to 2.0 mm, for example. A magnetic disk is produced by forming a magnetic layer on a main surface of the glass plate 1.

The glass plate 1 includes two main surfaces 11$p$ and 12$p$, a side wall face 11$w$ formed on each of end faces, and chamfered faces 11$c$ and 12$c$ provided between the side wall face 11$w$ and the main surfaces 11$p$ and 12$p$.

The side wall face 11$w$ includes the central position in the thickness direction of the glass plate 1. The inclination angles of the chamfered faces 11$c$ and 12$c$ relative to the main surfaces 11$p$ and 12$p$ are not particularly limited, and are 45°, for example. The boundaries between the side wall face 11$w$ and the chamfered faces 11$c$ and 12$c$ are not limited to a shape with edges as shown in the diagram, and may also be rounded such that the side wall face 11$w$ and the chamfered faces 11$c$ and 12$c$ are smoothly continuous with each other.

Figure 1C:
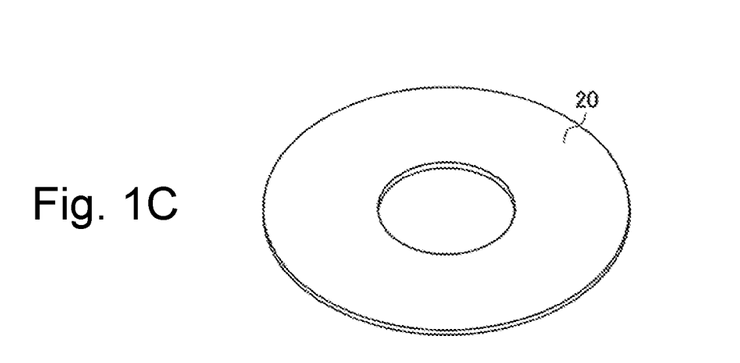
FIG. 1C is a diagram showing an example of a spacer to be used in one embodiment.

FIG. 1C a diagram showing an example of a spacer to be used in one embodiment.

A spacer 20 shown in FIG. 1C is a disk-shaped sheet-like member provided with a circular hole at the center thereof. When a laminate of the disk-shaped glass plates 1 is formed in order to perform end face polishing on the inner end faces and the outer end faces of the glass plates 1, the spacer 20 is provided between the adjacent glass plates in the laminate to keep the adjacent glass plates 1 apart from each other. In other words, the laminate includes a plurality of glass plates 1, and spacers 20 that are each arranged between one of the glass plates 1 and another one of the glass plates 1 adjacent thereto to keep the adjacent glass plates 1 apart from each other. In FIG. 1C, faces that form the disk shape of the spacer 20 and come into contact with glass plates 1 in the laminate refer to "main surfaces".

The inner diameter of the circular hole provided in the disk shape of the spacer 20 is larger than the inner diameter of the circular hole provided in the disk-shaped glass plate 1, and the outer diameter of the disk shape of the spacer 20 is smaller than the outer diameter of the disk-shaped glass plate 1. In other words, the areas of the main surfaces of the spacer 20, which come into contact with the glass plates 1, are smaller than the areas of the main surfaces of the glass substrate 1. The inner diameter of the circular hole of the spacer 20 and the outer diameter of the disk shape of the spacer 20 are determined such that, when the spacer 20 is provided between the glass plates 1, neither the inner end nor the outer end of the spacer 20 protrudes from the position of the chamfered faces 11$c$ and 12$c$, specifically, the position of the boundary between the chamfered face 11$c$ and the main surface 11$p$ and are located a predetermined distance away from the ends of the chamfered faces 11$c$ and 12$c$. The above-mentioned predetermined distance is 5 μm to 5 mm. If the distance between the chamfered faces 11$c$ and 12$c$ and the inner end or the outer end of the spacer 20 changes, the way a polishing jig such as a polishing brush comes into contact with the chamfered faces 11$c$ and 12$c$ will vary between the glass plates 1 during the end face polishing, and thus the polishing degree of the chamfered faces 11$c$ and 12$c$ (the surface roughness of the end face) will vary. To address this, the spacer 20 is formed such that the inner diameter of the circular hole of the spacer 20 and the outer diameter of the disk shape of the spacer 20 are highly accurate.

When a laminate is formed by stacking such spacers 20 and the glass substrates 1 alternately and is brought into a pressed state in which 0.60 MPa of pressure is applied thereto in the stacking direction by using a pressing jig, and then the pressure is released to bring the laminate into a non-pressed state, the thicknesses of the spacers 20 change due to the release of the pressure, and the amount of change ΔW in thickness per spacer 20 is 30 μm or less.

In one embodiment, it is preferable that the material of the spacer 20 is made of resin from the viewpoint that the surface of the substrate is less likely to be damaged. Preferable examples of the material include sheet materials and film materials made of nylon resin, acrylic resin, aramid resin, polyethylene (PE) resin, polypropylene (PP) resin, polyurethane (PU) resin, polyethylene terephthalate (PET) resin, and the like, and woven fabrics and non-woven fabrics made of fibers of these resins. These resins may contain additives such as a filler and an inorganic material. The material of the spacer 20 may be made of resin, or paper made of pulp fibers, or paper or synthetic paper made of pulp fibers and resin fibers. The spacer 20 may also be formed by stacking a plurality of sheet materials or the like as mentioned above.

Figure 2:
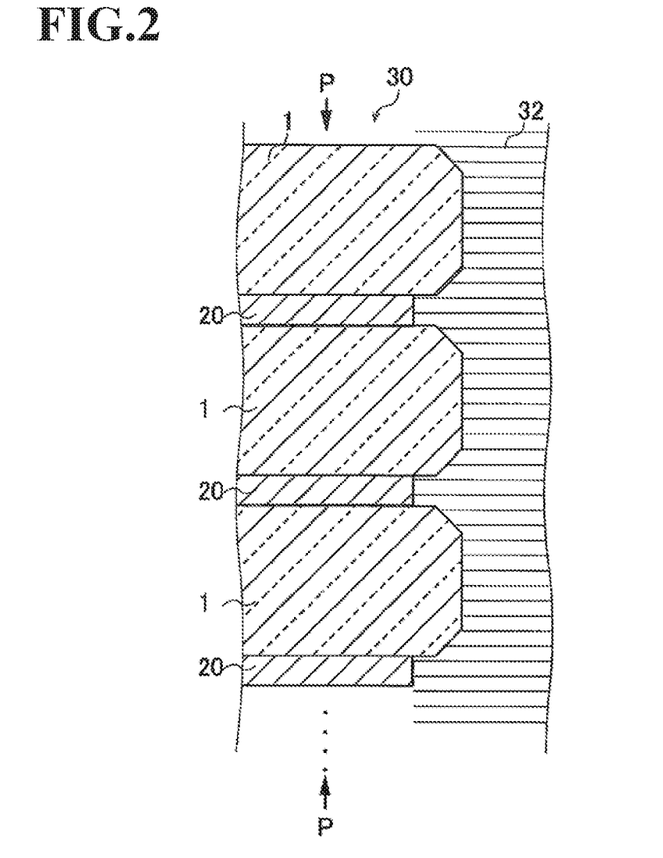
FIG. 2 is a diagram for describing an example of polishing processing for polishing the side face of a laminate of glass plates to be used in one embodiment.

FIG. 2 is a diagram for describing an example of polishing processing in which end faces of the glass plates 1 are polished by polishing the side face of a laminate 30.

As shown in FIG. 2, in the laminate 30, the spacer 20 is provided between one adjacent glass plate 1 and another glass plate 1 adjacent thereto to keep the glass plates 1 apart from each other. At this time, pressure P is applied to the laminate 30 from two sides in the stacking direction (the thickness direction of the glass plate 1) to bring the laminate 30 into a pressed state. The laminate 30 is brought into a pressed state in order to prevent the end faces from being nonuniformly polished due to some glass plates 1 in the laminate 30 rotating in a different way from glass plates 1 adjacent thereto when the end faces are polished by rotating the laminate 30 and a polishing jig relative to each other. FIG. 2 shows a polishing brush 32 as an example of the polishing jig. When the polishing is performed, the laminate 30 is pressed in the stacking direction, and in this state, the end faces (the outer end faces or the inner end faces) of the glass plates 1 are polished using the polishing jig while a polishing liquid is supplied to the end faces. When the end face polishing is performed, the polishing jig and the glass plates 1 are rotated such that the polishing jig and the end faces (the outer end faces or the inner end faces) of the glass plates 1 move relative to each other.

Figure 3:
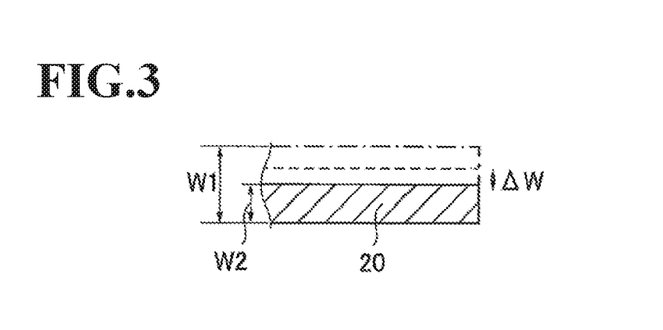
FIG. 3 is a diagram for describing an amount of change $\Delta W$ in thickness of the spacer of one embodiment when pressure applied to the spacer is released to bring the spacer from a pressed state into a non-pressed state.

FIG. 3 is a diagram for schematically describing the amount of change ΔW in thickness per spacer 20 of one embodiment when pressure applied to the spacer 20 is released to bring the spacer 20 from a pressed state into a non-pressed state. Although the difference between W2+ΔW and W1 is emphasized in FIG. 3 for facilitating the understanding, the difference between W2+ΔW and W1 may be small (e.g., close to substantially zero). As shown by a hatched area in FIG. 3, the spacer 20 in the pressed state is compressed and reduced in thickness compared with an average thickness W1 of the spacers 20 in the non-pressed state (initial state), and has an average thickness W2. After the spacer 20 has been left to stand in this state for 3 minutes or more, for example, and then the pressure is released, the thickness of the spacer 20 increases due to restoration to its original shape. This amount of change in thickness is referred to as ΔW.

If such an amount of change ΔW in thickness per spacer 20 is large, when the pressure applied to the laminate 30 is released to bring the laminate 30 into a non-pressed state between a step of polishing the outer end faces and a step of polishing the inner end faces, the position of the spacer 20 provided between the adjacent glass plates 1 greatly shifts due to the restoration, and thus the position of one glass plate 1 is likely to shift relative to the position of another glass plate 1 adjacent thereto due to the positional shifting of the spacer 20. If the laminate of the glass plates 1 is pressed again and the end face polishing is performed in the state in which the positional shifting has occurred, the position of a glass plate 1 whose position has shifted, relative to a glass plate adjacent thereto changes, and thus polishing allowance varies. Moreover, if the position of the end (the inner end or the outer end) of the spacer 20 moves toward the chamfered faces 11c and 12c, the way the chamfered faces 11c and 12c are polished will be vary between the glass plates 1.

Accordingly, as described above, the amount of change ΔW in thickness per spacer 20 is set to 30 μm or less.

The above-described end face polishing performed on the glass plates 1 is a portion of a method for manufacturing a glass plate. Hereinafter, a method for manufacturing a glass substrate for a magnetic disk will be described as an example of the method for manufacturing a glass plate.

A raw glass plate used to form the glass plate 1 is a plate with a constant thickness produced using a float method or a down draw method, for example. Alternatively, a plate obtained by molding a glass mass through press molding using a mold may also be used as the raw glass plate. The thickness of the raw glass plate is larger by grinding allowance or polishing allowance than the target thickness of a glass substrate for a magnetic disk, which is a final product. The thickness of the raw glass plate is larger by about several micrometers to several hundred micrometers than the target thickness, for example.

Next, the raw glass plate is subjected to shaping processing so as to form a disk-shaped glass plate 1. In the shaping processing, the raw glass plate may be cut along a scriber line that is mechanically formed on the raw glass plate using a scriber, for example, or the raw glass plate may be altered using a laser beam such that a portion thereof is likely to crack, and then cut by heating.

Next, the cut face of the raw glass plate shaped into a disk shape is subjected to shaping processing for forming chamfered faces 11c and 12c. The chamfered faces 11c and 12c are formed using a formed grindstone, for example. Thus, a glass plate 1 having a shape shown in FIG. 1B is produced.

Next, an end face of the glass plate 1 is polished. When an end face of the glass plate 1 is polished, as shown in FIG. 2, pressure P is applied, in the stacking direction, to a laminate 30 formed by stacking a plurality of glass plates 1 and spacers 20 with each of the spacers 20 being provided between the glass plates 1, to bring the laminate 30 into a pressed state, and in this state, a side face (the inner side face formed by the inner end faces of the glass plates 1 or the outer side face formed by the outer end faces of the glass plates 1) of the laminate 30 is polished using a polishing jig such as a polishing brush 32 while a polishing liquid is supplied to the side face.

When the inner side face of the laminate 30, which corresponds to the inner end faces of the glass plate 1, is polished, the laminate 30 is fixed by using a fixing jig (not shown) to press a region near the outer side face on the main surface of a glass plate 1 located at the top or bottom of the laminate 30. Then, the polishing jig is inserted into a space of the laminate 30, which corresponds to the circular holes of the glass plates 1, and is pressed against the inner side face from the inside to polish the inner side face.

When the outer side face of the laminate 30, which corresponds to the outer end faces of the glass plate 1, is polished, the laminate 30 is fixed by inserting a fixing jig (not shown) into a space of the laminate 30, which corresponds to the circular holes of the glass plates 1, and pressing a region near the inner side face on the main surface of a glass plate 1 located at the top or bottom of the laminate 30. Then, the polishing jig is pressed against the outer side face of the laminate 30 from the outside to polish the outer side face.

Next, the main surfaces of the glass plate 1 whose end faces have been polished are ground and polished.

When the glass plate 1 is ground, the main surfaces of the glass plate 1 are ground using a double-side grinding device provided with a planetary gear mechanism. Specifically, the main surfaces on the two sides of the glass plate 1 are ground while the outer end face of the glass plate 1 is held in a holding hole provided in a holding member of the double-side grinding device. The double-side grinding device has a pair of upper and lower surface plates (upper surface plate and lower surface plate), and the glass plate 1 is held between the upper surface plate and the lower surface plate. The two main surfaces of the glass plate 1 can be ground by moving one or both of the upper surface plate and the lower surface plate to move the glass plate 1 and the surface plates relative to each other while a coolant is supplied. For example, the grinding processing can be performed using surface plates to which grinding members that are sheet-like members made of fixed abrasive particles obtained by fixing diamond with resin are attached.

Next, first polishing is performed on the main surfaces of the glass plate 1, which has undergone the grinding processing. Specifically, the main surfaces on the two sides of the glass plate 1 are polished while the outer end face of the glass plate 1 is held in a holding hole provided in a carrier for polishing of the double-side polishing device. The first polishing is performed in order to eliminate scratches and distortions that remain on the main surfaces due to the grinding processing and to adjust minute surface unevenness (microwaviness, roughness).

In the first polishing, the glass plate 1 is polished using a double-side polishing device having the same configuration as that of the double-side grinding device used in the above-described grinding processing using fixed abrasive particles while a polishing slurry is supplied. In the first polishing, a polishing slurry containing loose abrasive particles. Abrasive particles made of cerium oxide, zirconia, or the like are used as the loose abrasive particles used in the first polishing. Also in the double-side polishing device, the glass plate 1 is held between a pair of upper and lower surface plates in the same manner as in the double-side grinding device. Planar polishing pads (e.g., resin polishers) having a disk shape as a whole are attached to the upper surface of the lower surface plate and the bottom surface of the upper surface plate. The two main surfaces of the glass plate 1 are polished by moving one or both of the upper surface plate and the lower surface plate to move the glass plate 1 and the surface plates relative to each other. Regarding the size, the polishing abrasive particles preferably have an average particle diameter (D50) within a range from 0.5 μm to 3 μm.

After the first polishing, the glass plate 1 may be chemically strengthened. In this case, a mixed molten liquid of potassium nitrate and sodium sulfate, or the like is used as a chemical strengthening liquid, and the glass plate 1 is immersed in the chemical strengthening liquid. Thus, a compressive stress layer can be formed on the surfaces of the glass plate 1 by ion exchange. The chemical strengthening may be performed after second polishing. It should be noted whether or not the chemical strengthening is performed may be selected as appropriate in consideration of the glass composition and necessity.

Next, second polishing is performed on the glass plate 1. The second polishing processing is performed for the purpose of mirror polishing of the main surfaces. Also in the second polishing, a double-side polishing device having the same configuration as that of the double-side polishing device used in the above-described first polishing is used. Specifically, the main surfaces on the two sides of the glass plate 1 are polished while the outer end face of the glass plate 1 is held in a holding hole provided in a carrier for polishing of the double-side polishing device. The second polishing is different from the first polishing in the type and size of loose abrasive particles, and the hardness of resin polishers. It is preferable that the hardness of resin polishers is lower than that in the first polishing. The main surfaces of the glass plate 1 are polished while a polishing liquid containing colloidal silica as loose abrasive particles is supplied between the polishing pads of the double-side polishing device and the main surfaces of the glass plate 1. Regarding the size, the polishing abrasive particles used in the second polishing preferably have an average particle diameter (D50) within a range from 5 nm to 50 nm.

Another polishing may be performed in addition to the first polishing and the second polishing, or the two main surfaces may be polished only once. The above-mentioned processing order may be changed as appropriate.

After the second polishing, the glass plate 1 is washed.

Polishing the main surfaces of the glass plate 1 in this manner makes it possible to form a glass substrate for a magnetic disk that satisfies the conditions required for a glass substrate for a magnetic disk.

As described above, setting the amount of change ΔW in thickness per spacer 20 to be 30 μm or less makes it less likely that the position of the spacer 20 as well as the positions of the glass plates 1 will shift even when the pressure is released to bring the laminate 30 from a pressed state into a non-pressed state in the end face polishing of the method for manufacturing a glass plate. Accordingly, a variation in polishing degree between the glass plates 1 in the laminate 30 is suppressed.

In one embodiment, a contact angle of the spacer 20 with respect to pure water is preferably 50° or less. The main component of the polishing liquid is water, and therefore, when the contact angle with respect to pure water is 50° or less, the spacer 20 easily becomes wet. The lower limit of the contact angle is not particularly limited, but is 0° or more, for example. When such a hydrophilic spacer 20 is used, an appropriate amount of water is held between the glass plates 1 and the spacers 20 in the laminate 30, and therefore, the glass plates 1 and the spacers 20 are less likely to undergo displacement due to increased adhesion therebetween. Moreover, damage caused by contact with the spacers 20 is less likely to occur in the main surfaces of the glass plate 1. Even when a laminate formed in a dry state without being wet in advance is brought into a pressed state and is subjected to the polishing processing, moisture in the polishing liquid can quickly penetrate between the glass plates 1 and the spacers 20. This means that a laminate can be formed in a dry state. That is, in particular, handling of spacers that are lightweight and soft and have extremely low rigidity is facilitated, and thus the production efficiency is improved. Particularly, when spacers that are lightweight and soft and have extremely low rigidity are wet, they easily attach to various things and are likely to crumple when being attached to something, thus making it likely that a laminate will be difficult to form.

It should be noted that, in the measurement of a contact angle, 1 μl (microliter) of the polishing liquid is dropped onto the surface of the spacer 20, and a contact angle is measured using a contact angle measurement apparatus 10 seconds after the polishing liquid has been dropped. It should be noted that, if the surface of the spacer 20 is dirty, the surface is cleaned in advance, and the measurement is performed in a completely dry state.

Moreover, in one embodiment, it is preferable that the spacer 20 is water-resistant such that high strength can be maintained even when the spacer 20 is wet with the polishing liquid. This makes it less likely that the spacer 20 will be damaged even when being incorporated into a laminate in a wet state, which results in improved rigidity. In addition, the spacer 20 can be used repeatedly, thus making it possible to reduce the production cost.

Water-resistance can be imparted by using a material that is poorly soluble in water as the material of the spacer 20, or providing a surface layer that prevents penetration of water on the surface of the spacer, or performing surface treatment. When the spacer 20 is a woven fabric or non-woven fabric made of fibers, it is sufficient that fibers that are poorly soluble in water are used, or fibers in which a water-resistant coating is provided on the surfaces are used, for example.

As described above, the end faces of the glass plates 1 are polished by polishing the side face of the laminate 30 including the multiple glass substrates 1 and spacers 20, and therefore, the production efficiency of the glass plates 1 is high, and in addition, the glass plates 1 can be substantially uniformly polished.

In one embodiment, the surface roughness Ra (arithmetic mean roughness; JIS B0601:2001) is preferably 0.2 μm or more. If the surface roughness Ra of the spacer 20 is less than 0.2 μm, the adhesion of the spacer 20 to a substrate such as the glass plate 1 is excessively high. Accordingly, it is difficult to remove the spacer 1 from the substrate, the workability deteriorates, and in some cases, the spacer 20 cannot be removed from the substrate. On the other hand, if the surface roughness Ra of the spacer 20 is greater than 5.0 μm, the surface of the substrate may be damaged. Accordingly, the upper limit of the surface roughness Ra is preferably 5.0 μm. It should be noted that the surface roughness Ra of the main surface of the spacer 20 is measured using a stylus type roughness tester.

In one embodiment, the processing performed on the side face of the laminate 30 of the glass plates 1 includes:

processing for bringing the laminate 30 obtained by alternately stacking the glass plates 1 and the spacers 20 into a pressed state;

first side face processing for processing a side face of the laminate 30 in the pressed state;

processing for releasing the laminate 30 from the pressed state after performing the first side face processing;

intermediate processing for performing one of dividing the laminate 30 released from the pressed state into two or more laminates, combining the laminate 30 released from the pressed state with another laminate in a stacking direction, and leaving the laminate 30 released from the pressed state as it is;

processing for bringing the laminate that has undergone the intermediate processing into a pressed state after performing the intermediate processing; and second side face processing for further processing a side face of the laminate that has undergone the intermediate processing and is in the pressed state.

In the processing for bringing the laminate 30 into a pressed state, the pressed state is brought about by pressing substrates such as dummy substrates located at the two ends of the laminate 30 in the stacking direction using a pressing jig.

Figure 4A:
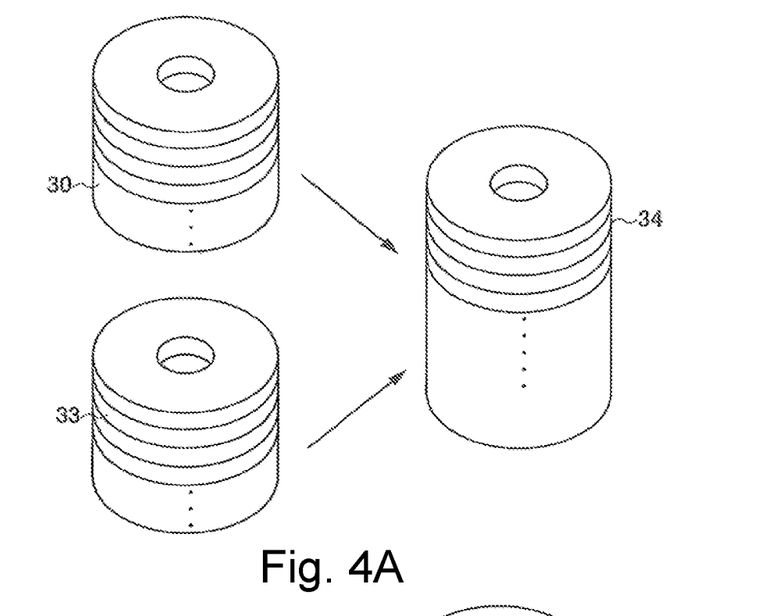
FIGS. 4A and 4B are diagrams for describing a change in form of the laminate of glass plates when second end face polishing is performed after first end face polishing has been performed.

FIG. 4A is a diagram for describing an example of processing for polishing end faces of glass plates according to one embodiment.

For example, the inner end face of the glass plate 1 is taken as a first end face and the inner side face of the laminate 30 is taken as a first side surface, and then the first end face polishing processing (first side face processing) is performed. In the subsequent second end face polishing processing, the outer end face of the glass plate 1 is taken as a second end face and the outer side face of the laminate 30 is taken as a second side face, and then the processing (second side face processing) is performed. In the second end face polishing processing, a combined laminate 34 obtained by combining the laminate 30 and a laminate 33 of the glass plates 1 that has separately undergone the first end face polishing processing is subjected to the end face polishing. Alternatively, the outer end face of the glass plate 1 is taken as a first end face and the outer side face of the laminate 30 is taken as a first side surface, and then the first end face polishing processing (first side face processing) is performed. In the subsequent second end face polishing processing, the inner end face of the glass plate 1 is taken as a second end face and the inner side face of the laminate 30 is taken as a second side face, and then the processing (second side face processing) is performed. In the second end face polishing processing, a combined laminate 34 obtained by combining the laminate 30 and a laminate 33 of the glass plates 1 that has separately undergone the first end face polishing processing is subjected to the end face polishing.

Figure 4B:
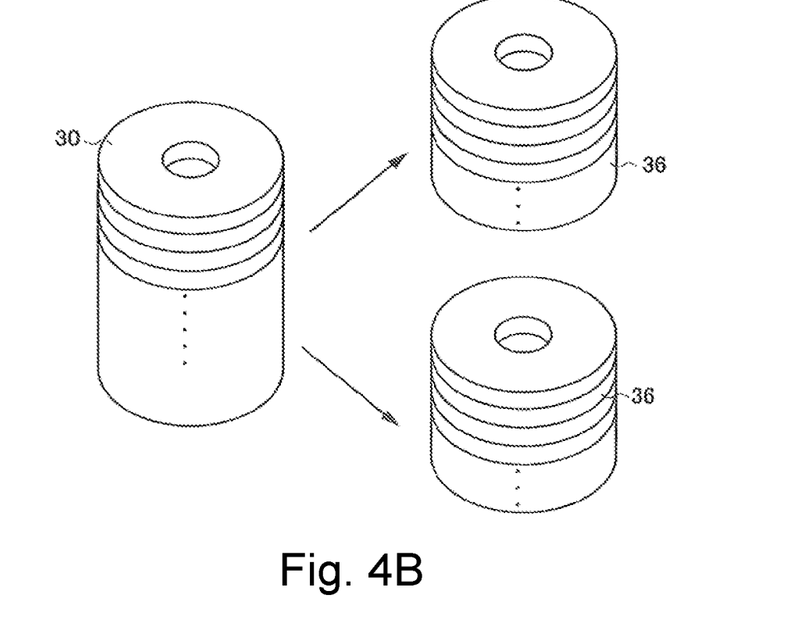

FIG. 4B is a diagram for describing an example of processing for polishing end faces of glass plates according to another embodiment that is different from a mode shown in FIG. 4A.

For example, the inner end face of the glass plate 1 is taken as a first end face and the inner side face of the laminate 30 is taken as a first side surface, and then the first end face polishing processing (first side face processing) is performed. In the subsequent second end face polishing processing, the outer end face of the glass plate 1 is taken as a second end face and the outer side face of the laminate 30 is taken as a second side face, and then the processing (second side face processing) is performed. In the second end face polishing processing, the laminate 30 is divided into two or more divided laminates 36, and the end face polishing is performed on one of the divided laminates 36. Alternatively, the outer end face of the glass plate 1 is taken as a first end face and the outer side face of the laminate 30 is taken as a first side surface, and then the first end face polishing processing (first side face processing) is performed. In the subsequent second end face polishing processing, the inner end face of the glass plate 1 is taken as a second end face and the inner side face of the laminate 30 is taken as a second side face, and then the processing (second side face processing) is performed. In the second end face polishing processing, the laminate 30 is divided into two or more divided laminates 36, and the end face polishing is performed on one of the divided laminates 36.

It should be noted that, in the example shown in FIG. 4B, the thickness of the laminate 30 that has undergone the first end face polishing processing is the same as that of the combined laminate 34 shown in FIG. 4A, but the thickness of the laminate 30 may be different from that of the combined laminate 34.

Performing the second end face polishing processing using the combined laminate 34 or divided laminate 36 as described above makes it possible to reduce the waiting time of the laminates between when the first end face polishing processing is finished and when the second end face polishing processing is started and to improve the polishing efficiency for the glass plates 1 even when the number of glass plates 1 that can be processed in the first end face polishing processing is significantly different from the number of glass plates 1 that can be processed in the second end face polishing processing. In other words, the processing time of the first end face polishing processing and the processing time of the second end face polishing processing can be brought close to each other, and therefore, neither the first end face polishing processing nor the second end face polishing becomes a bottleneck. Accordingly, the efficiency of the entire end face polishing processing can be improved.

For example, the circumferential length of the outer side face to be polished is longer than that of the inner side face to be polished. Therefore, the total polishing allowance of the outer side face is larger than that of the inner side face under the same polishing conditions, and thus it takes more time to polish the outer side face. Therefore, when the laminate 34 obtained by combining the laminates 30 and 33 that have undergone the inner side face polishing is used to simultaneously polish a large number of outer end faces of the glass plates 1, the polishing efficiency for the glass plates 1 can be improved. When an end face polishing apparatus that can divide a laminate into two laminates and simultaneously polish the second side faces of the laminates is used, the second side faces of the two divided laminates 36 can be simultaneously polished, thus making it possible to improve the polishing efficiency for the glass plates 1.

In the examples shown in FIGS. 4A and 4B, the second end face polishing processing is performed after the laminate 30 that has undergone the first end face polishing processing is combined with another or divided, but the second end face polishing processing may be performed on the laminate 30 as it is without combining the laminates 30 or dividing the laminate 30.

In the examples shown in FIGS. 4A and 4B, end faces of the glass plates 1 to be processed in the first end face polishing processing and end faces of the glass plates 1 to be processed in the second face polishing processing are different, but these end faces may also be the same, and may be the inner end face or the outer end face, for example. In other words, the inner end faces or the outer end faces may be continuously polished in the first end face polishing processing and the second end face polishing processing. In this case, two modes of different polishing precisions such as rough polishing processing and fine polishing processing may be performed.

The glass plates 1 in the laminate shown in FIGS. 4A and 4B that has undergone the first end face polishing processing and the second end face polishing processing may be shipped from a processor that has performed the first end face polishing processing and the second end face polishing processing to another processor, and the other processor may perform postprocessing including grinding and polishing of the main surfaces and the like of the glass plates 1. In other words, the glass plates 1, namely the glass plates 1 that have undergone the end face processing, can be used as intermediate products. Such intermediate products are also referred to as substrates in this specification.

Moreover, a processor that has performed the first end face polishing processing and the second end face polishing processing on glass plates 1 may also perform postprocessing including grinding and polishing of the main surfaces and the like of the glass plates 1. One embodiment includes processing for manufacturing a glass plate 1 (substrate) that is used to produce substrates for a magnetic disk using the above-mentioned method for manufacturing a substrate including performing the first end face polishing processing and the second end face polishing processing on a laminate, and postprocessing including at least polishing of the main surfaces of the glass plate 1 (substrate) after the second face polishing processing has performed on the laminate.

Experimental Example 1

In order to confirm the effects of the spacer 20 to be used in such a method for manufacturing a glass plate 1, end faces of the glass plates 1 (the outer diameter was 95.05 mm, the inner diameter of the circular hole was 24.95 mm, the thickness was 0.7 mm, the widths in the main surface direction of the chamfered faces located at the outer end portion and the inner end portion were 150 μm and the angles thereof were 45°, and the roundness of the outer end portion (outer diameter) and the inner end portion (inner diameter) was 2 μm or less) that were stacked with the spacers 20 being provided therebetween were polished. In both the outer end portion and the inner end portion, the target allowance of the end face polishing was 50 μm in terms of a diameter.

Spacers with various thicknesses made of various materials were used to vary the amount of change ΔW in thickness per spacer. The end face polishing was performed on the glass plates 1 using a laminate 30 including one hundred and one glass plates 1 and one hundred spacers 20. Here, two glass substrates 1 located at the two ends of the laminate 30 were used as dummy substrates, and thus ninety-nine glass substrates 1 excluding these dummy substrates were to be processed. The glass plates 1 and the spacers were prepared in a dry state, and were alternately stacked using a laminate formation apparatus such that the spacers 1 did not protrude from the main surfaces 11p and the glass plates 1 and the spacers were concentric.

In the end face polishing, after the inner side face of the laminate 30 in a pressed state (pressure P=0.60 MPa) was polished by performing the end face polishing in a state in which the stacking direction extends in the vertical direction, the pressure was released to bring the laminate 30 from the pressed state into a non-pressed state in the state in which the stacking direction extends in the vertical direction. Then the outer side face of the laminate was polished after the laminate was brought into a pressed state (pressure P=0.60 MPa) again in order to polish the outer side face of the laminate 30. It should be noted that operations for correcting positional shifting of the glass plates 1 and the spacers (e.g., disassembling of the laminate and restacking) were not performed.

A contact angle of pure water with respect to the spacers was 50° or less, and the spacers had a surface roughness Ra within a range from 0.2 to 5 μm.

When the laminate 30 is brought from a pressed state into a non-pressed state, the positions of the spacers 20 and the glass plates 1 shift in the main surface direction, and the polishing results vary between the glass plates 1 due to the positional shifting. Accordingly, the roundness of the outer end faces of all the glass plates 1 that had undergone the outer end face polishing was measured, and it was confirmed whether or not a glass plate 1 whose roundness was significantly impaired existed. Specifically, cases where even only one glass plate of the ninety-nine glass plates had a roundness of 10 μm or more were not acceptable.

Table 1 below shows the materials of the spacers, the thicknesses (average thicknesses W1) of the spacers, the amounts of change ΔW in thickness per spacer, and the results of acceptance. Sheet materials were used in Examples 1 to 8 and Comparative Examples 2 to 4, and a non-woven fabric made of fibers of polyester resin was used in Comparative Example 1.

TABLE 1

| | Material | Thickness of spacer (μm) | ΔW (μm) | Result of acceptance |
|---|---|---|---|---|
| Ex. 1 | PP resin | 150 | 1 | Acceptable |
| Ex. 2 | PP resin | 200 | 6 | Acceptable |
| Ex. 3 | PP resin | 300 | 10 | Acceptable |
| Ex. 4 | PET resin | 200 | 13 | Acceptable |
| Ex. 5 | PU resin | 1000 | 18 | Acceptable |
| Ex. 6 | PU resin | 1200 | 30 | Acceptable |
| Ex. 7 | PP resin | 100 | 0.8 | Acceptable |
| Ex. 8 | PET resin | 400 | 20 | Acceptable |
| Comp. Ex. 1 | Non-woven fabric | 1000 | 34 | Non-acceptable |
| Comp. Ex. 2 | PU resin | 200 | 35 | Non-acceptable |
| Comp. Ex. 3 | PO resin | 150 | 37 | Non-acceptable |
| Comp. Ex. 4 | PO resin | 200 | 40 | Non-acceptable |

As is clear from Table 1, when the spacers whose amount of change ΔW in thickness per spacer is 30 μm are used, the positions of the spacers and the glass plates 1 are less likely to shift, thus making it possible to reduce a variation in the results of polishing of the outer end faces. It should be noted that it is understood that the amount of change ΔW may be 30 μm or less and the spacers are acceptable even when the thicknesses (average thickness W1) of the spacers are greater than 200 μm as shown in Examples 5, 6, and 8, and the amount of change ΔW may be 30 μm or less or greater than 30 μm and the result of acceptance may vary even when the thicknesses of the spacers are 200 μm or less as shown in Examples 1, 2, 4, and 7, and Comparative Examples 2 to 4. In other words, it is understood that it is not possible to determine whether or not spacers are acceptable from the thicknesses of the spacers.

Experimental Example 2

Spacers 20 having the same specifications as that of Example 2 except that the surface roughness Ra of the spacer was varied were prepared, and the end face polishing (including polishing of the inner side face and the outer side face of the laminate) was performed in the same manner as in Experimental Example 1. Then, workability was evaluated at the time of dividing (disassembling) the laminate that had undergone the end face polishing.

The laminate was divided using a known laminate dividing apparatus. This apparatus separates one glass plate 1 using a vacuum chuck, and then blows away a spacer 20 attached to a glass plate 1 by blowing air. However, when adhesion of the spacer 20 to the glass 1 was excessively strong and the spacer 20 could not be removed successfully, this is evaluated as a separation error. Evaluation was made as to whether or not a separation error occurred. When only one spacer 20 was not separated, it was evaluated as "a separation error occurred".

TABLE 2

|        | Ra (μm) | Separation error |
|--------|---------|------------------|
| Ex. 2A | 0.1     | Yes              |
| Ex. 2B | 0.2     | No               |
| Ex. 2C | 1       | No               |
| Ex. 2D | 3       | No               |
| Ex. 2E | 5       | No               |

As is clear from Table 2, when the surface roughness Ra of the spacers 20 are 0.2 μm or more, a separation error does not occur, and thus workability is improved.

Although the spacer, the laminate of substrates, the method for manufacturing a substrate, and the method for manufacturing a substrate for a magnetic disk of the present invention have been described in detail, the present invention is not limited to the above-described embodiment and examples, and it will be appreciated that various improvements and modifications can be made without departing from the gist of the present invention.

The invention claimed is:

1. A sheet-like spacer to be used when a laminate of a plurality of substrates is formed for the purpose of processing end faces of the substrates, the spacer being provided between the adjacent substrates in the laminate to keep the adjacent substrates apart from each other,
wherein an area of the spacer is smaller than that of the substrates, and
when pressure is released to bring the laminate obtained by providing the spacers between the substrates from a pressed state in which 0.60 MPa of pressure is applied to the laminate in a stacking direction into a non-pressed state, an amount of change ΔW in thickness per spacer that is calculated from a change in the thickness of the laminate due to the release of pressure is 30 μm or less.

2. The spacer according to claim 1, which is made of resin.

3. The spacer according to claim 1, which has a surface roughness Ra of 0.2 μm or more.

4. The spacer according to claim 1, which is water-resistant.

5. A laminate comprising:
a plurality of substrates; and
the spacer according to claim 1 provided between the adjacent substrates of the plurality of substrates.

6. The spacer according to claim 2, which has a surface roughness Ra of 0.2 μm or more.

7. The spacer according to claim 2, which is water-resistant.

8. The spacer according to claim 3, which is water-resistant.

9. The spacer according to claim 6, which is water-resistant.

10. A laminate comprising:
a plurality of substrates; and
the spacer according to claim 2 provided between the adjacent substrates of the plurality of substrates.

11. A laminate comprising:
a plurality of substrates; and
the spacer according to claim 3 provided between the adjacent substrates of the plurality of substrates.

12. A laminate comprising:
a plurality of substrates; and
the spacer according to claim 4 provided between the adjacent substrates of the plurality of substrates.

13. A laminate comprising:
a plurality of substrates; and
the spacer according to claim 6 provided between the adjacent substrates of the plurality of substrates.

* * * * *